(12) United States Patent
Specht

(10) Patent No.: US 6,641,075 B2
(45) Date of Patent: Nov. 4, 2003

(54) SEAT BELT RETRACTOR

(75) Inventor: Martin Specht, Feldafing (DE)

(73) Assignee: Brees Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/134,388

(22) Filed: Apr. 30, 2002

(65) Prior Publication Data
US 2002/0166914 A1 Nov. 14, 2002

(30) Foreign Application Priority Data
May 11, 2001 (DE) .......................... 101 22 910

(51) Int. Cl.⁷ .......................... B60R 22/28; B60R 22/46
(52) U.S. Cl. .................... 242/374; 242/379.1
(58) Field of Search ................ 242/374, 379.1; 280/805, 806; 297/478, 480, 472

(56) References Cited

U.S. PATENT DOCUMENTS

| | | | | |
|---|---|---|---|---|
| 5,526,996 A | * | 6/1996 | Ebner et al. | 242/374 |
| 5,938,135 A | * | 8/1999 | Sasaki et al. | 242/374 |
| 6,047,914 A | | 4/2000 | Sasaki | 242/379.1 |
| 6,065,706 A | | 5/2000 | Koning | 242/379.1 |
| 6,105,893 A | * | 8/2000 | Schmidt et al. | 242/374 |
| 6,343,522 B1 | * | 2/2002 | Hori et al. | 242/374 |
| 6,382,548 B1 | | 5/2002 | Nishizawa et al. | 242/379.1 |
| 6,405,959 B1 | * | 6/2002 | Klingauf et al. | 242/374 |

FOREIGN PATENT DOCUMENTS

| | | |
|---|---|---|
| DE | 19517440 | 11/1995 |
| DE | 29613044 | 12/1996 |
| DE | 29714583 | 1/1998 |
| DE | 19927731 | 12/2000 |
| DE | 20015402 | 2/2001 |
| EP | 0893313 | 1/1998 |
| EP | 0842831 | 5/1998 |
| WO | 00/71394 | 11/2000 |

* cited by examiner

Primary Examiner—John M. Jillions
(74) Attorney, Agent, or Firm—Lonnie Drayer; Jarett Rieger

(57) ABSTRACT

A seat belt retractor has a two-piece belt reel rotatably mounted on a seat belt retractor frame. The two pieces of the belt reel are a spool and a spool insert. A tightening drive creates a torque. A force transmission device transmits torque to the belt reel for winding the belt webbing onto the spool. A load limiter connects the spool and spool insert for to limit force on a seat belt-wearing vehicle occupant during the accelerated forward displacement of the seat belt-wearing vehicle occupant. During effective force limitation, when exceeding a preselected force threshold resulting from the belt force limitation effect and the torque of the tightening drive, in the force transmission device the torque transmission from the tightening drive to the belt reel is interrupted.

3 Claims, 6 Drawing Sheets

SEAT BELT RETRACTOR

FIELD OF THE INVENTION

The invention relates to a seat belt retractor.

DISCUSSION OF THE PRIOR ART

EP 0 842 831 B1 teaches a seat belt retractor frame, on which a two-piece belt reel is rotatably mounted. A seat belt is connected to the belt reel and can be wound onto or unwound from the belt reel. The seat belt retractor further comprises a tightening drive that generates a torque, which is transferred to the belt reel via a coupling. A load limiter connects the two reel parts to one another. The load limiter conveys a limited amount of the load exerted by the belt webbing on the seat belt-wearing vehicle occupant during an accelerated forward displacement of the vehicle occupant, in particular in a crash. Furthermore, in the known seat belt retractor, during efficient load limitation by a relative torsion of the two reel parts, the tightening drive is separated from the belt reel by disengaging the coupling.

SUMMARY OF THE INVENTION

There is provided in accordance with the present invention a seat belt retractor comprising: a two-piece belt reel rotatably mounted on a seat belt retractor frame, the belt reel comprising a spool onto which a seat belt webbing can be wound, said spool having a passageway extending longitudinally therethrough, and a spool insert inserted in said passageway; a tightening drive that generates a torque; a force transmission device via which torque can be transmitted from the tightening drive to the belt reel for winding up a webbing winding onto the spool; and a load limiter located in the passageway through said spool and connected to both the spool and the spool insert, said load limiter limiting force from a seat belt webbing on a seat belt-wearing vehicle occupant during an accelerated forward displacement of the seat belt-wearing vehicle occupant, whereby during the force limitation the spool insert is blocked against rotation and the spool rotates and energy is dissipated through the load limiter and the torque transmission from the tightening drive to the belt reel is interrupted, when a preselected force threshold resulting from the belt load limiter effect and the torque created by the tightening drive is reached in the force transmission device, the torque transmission from the tightening drive to the belt reel is stopped, whereby the restraint force upon the seat belt-wearing vehicle occupant originating from the applied seat belt is essentially determined by the load limiter alone.

DETAILED DESCRIPTION OF THE INVENTION

Figure 1:
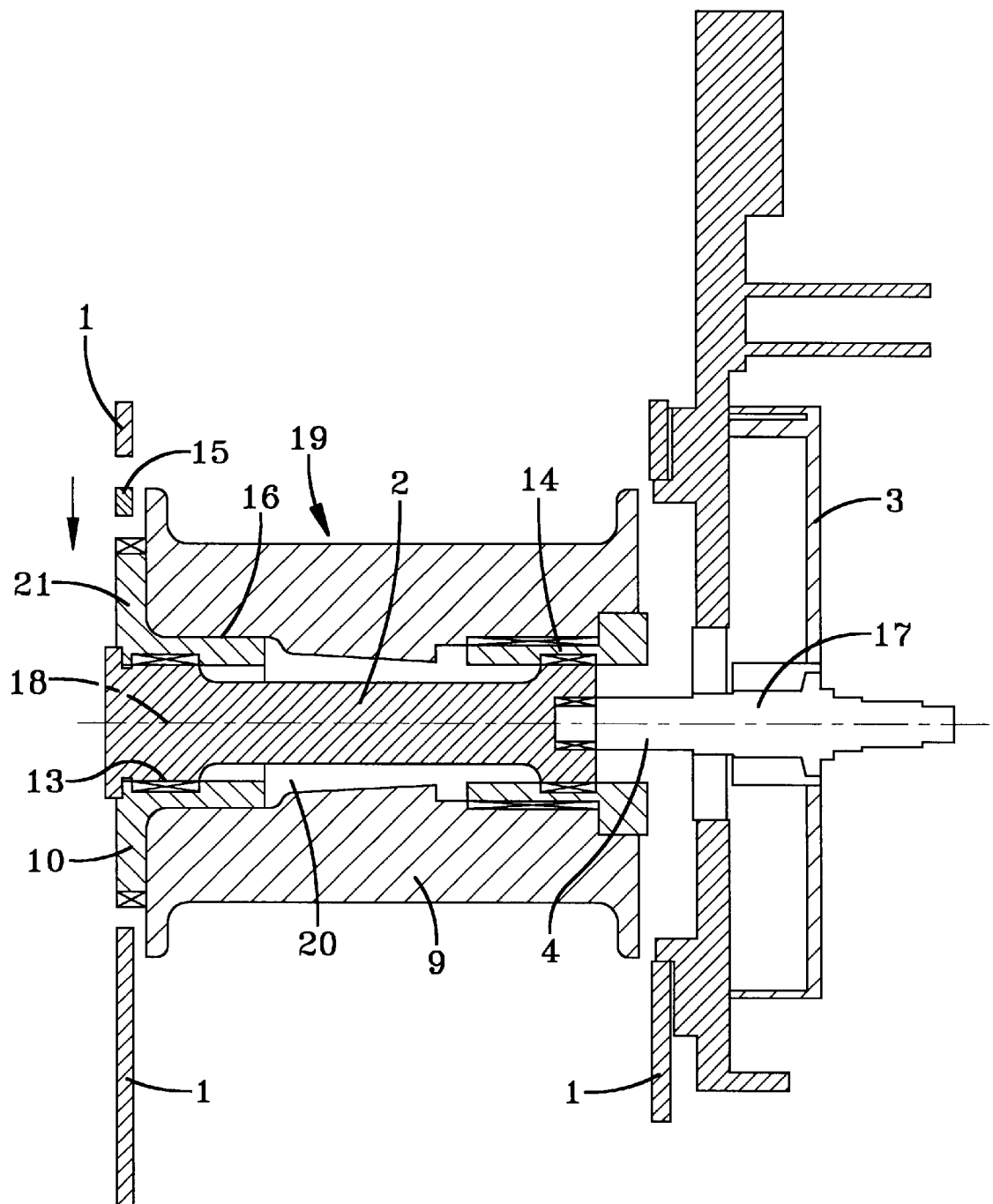
FIG. 1 is a longitudinal diagrammatic cross section of a seat belt retractor according to a first embodiment of the invention.

The represented embodiments relate to a seat belt retractor for use in a vehicle. These embodiments each have a seat belt retractor frame 1 in which a belt reel 19 is rotatably mounted. The belt reel 19 comprises two pieces, a spool 9 and a spool insert 10. The spool 9 has a passageway 20 extending longitudinally therethrough. The spool insert 10 is inserted the passageway 20 in the spool 9, and has a flange 21 that is located exterior of the spool. The spool 9 and spool insert 10 are connected to one another via a load limiter 2. The spool 9, to which the belt webbing of a vehicle seat belt, not further represented in the drawing, is securely connected to the one end of the load limiter 2 via a non-rotatable connector 14. The other end of the load limiter 2 is securely connected to the spool insert 10 via a non-rotatable connector 13. In the represented embodiments, the load limiter 2 comprises a torsion bar. However, load limiters with friction linings can also be used. Alternatively, a multistage load limiter with varying force limitation stages can be used as the load limiter.

The spool insert 10 can be blocked against rotation, in dependence on an acceleration sensor against rotation, by a blocking device 15 that is a blocking pawl that engages the flange 21 of the spool insert 10. During normal operation of a vehicle, the spool 9 on which the belt webbing is wound, as well as the load limiter 2 integrated in the belt reel 19, are not blocked against rotation.

The represented embodiments of the seat belt retractor further comprise a tightening drive 3 that creates a torque. The tightening drive is preferably an electric motor. The tightening drives represented in the illustrated embodiments are arranged essentially coaxially to the axis of rotation 18 of the belt reel 19. Alternatively, the tightening drive may be an electromotive tightening drive that is arranged parallel to the axis of rotation 18 of the belt reel, as disclosed in EP 0 893 313 A1. Also suitable, however, is any other tightening drive with which a torque can be created, by which the belt reel can be driven to tighten the seat belt webbing. The torque created by the tightening drive 3 is transmitted to the belt reel by force transmission devices to wind the belt webbing of the seat belt onto the spool 9 to tighten the seat belt. The tightening of the seat belt occurs if a crash is anticipated or in a crash. Due to the tightening of the seat belt, a seat belt-wearing vehicle occupant is securely restrained in the vehicle seat.

To limit the restraint forces exerted on the vehicle occupant by the seat belt during the forward displacement of the vehicle occupant, the spool insert 10 is blocked against rotation by the blocking device 15 engaging the flange 21 of the spool insert. The end of the load limiter 2 connected non-rotatably to the spool insert is also blocked against rotation. The spool 9 to which the seatbelt is connected, and which is connected in a non-rotatable manner to the other end of the load limiter 2 by a connector 14, can rotate around the axis of rotation 18 of the belt reel 19. Due to the distortion of the load limiter 2, energy is dissipated, as a result of which the restraint force exerted on the body of the vehicle occupant by the seat belt is reduced. The spool 9 rotates in opposition to the blocked spool insert 10. The rotatable spool 9 is loosely arranged on the spool insert 10 to form a pivot bearing 16. A radial support of the rotatable spool 9 is conveyed via the blocked spool insert 10 to the seat belt retractor frame 1 and to the load limiter 2 which is a torsion bar.

If this operation phase, in which the load limiter 2 is effective, the torque of the tightening drive 3, which is conveyed via a drive shaft 17, acts upon the rotatable spool 9. The present invention enables the tightening drive 3 to be decoupled from the belt reel 19, in particular from the rotatable spool 9, upon reaching a preselected force acting on the force transmission device 17 positioned between the tightening drive 3 and the belt reel 19.

In the embodiment shown in FIG. 1, the torque of the tightening drive 3 conveyed by the drive shaft 17 is transmitted via an additional torsion bar 4 to the belt reel 19, in particular the rotatable spool 9. The additional torsion bar 4 can be connected as one piece with the drive shaft 17 and if necessary has a reduced diameter to achieve the desired load limitation during the transmission of the torque to the belt reel. In the represented embodiment, the additional torsion bar 4 is connected in a non-rotatable manner to the end of the load limiter 2, which is connected in a non-rotatable manner with the spool 9 via the connector 14.

The drive shaft 17, which conveys the torque created by the tightening drive 3, is connected via an additional energy dissipation device such as a torsion bar 4 to the belt reel 19. The defined maximum amount of torque is transmitted to the belt reel. In addition to the load limiter 2, only a preselected force acts upon the rotatable spool 9, which decreases again during a crash. This decrease of the additional force takes place when the tightening drive 3 is accelerated to the extent that no further relative rotation needs to be introduced via the drive shaft 17 to the belt reel 19, or just the rotatable spool 9. A decreasing belt force curve can be achieved, as shown in FIG. 6.

Figure 6:
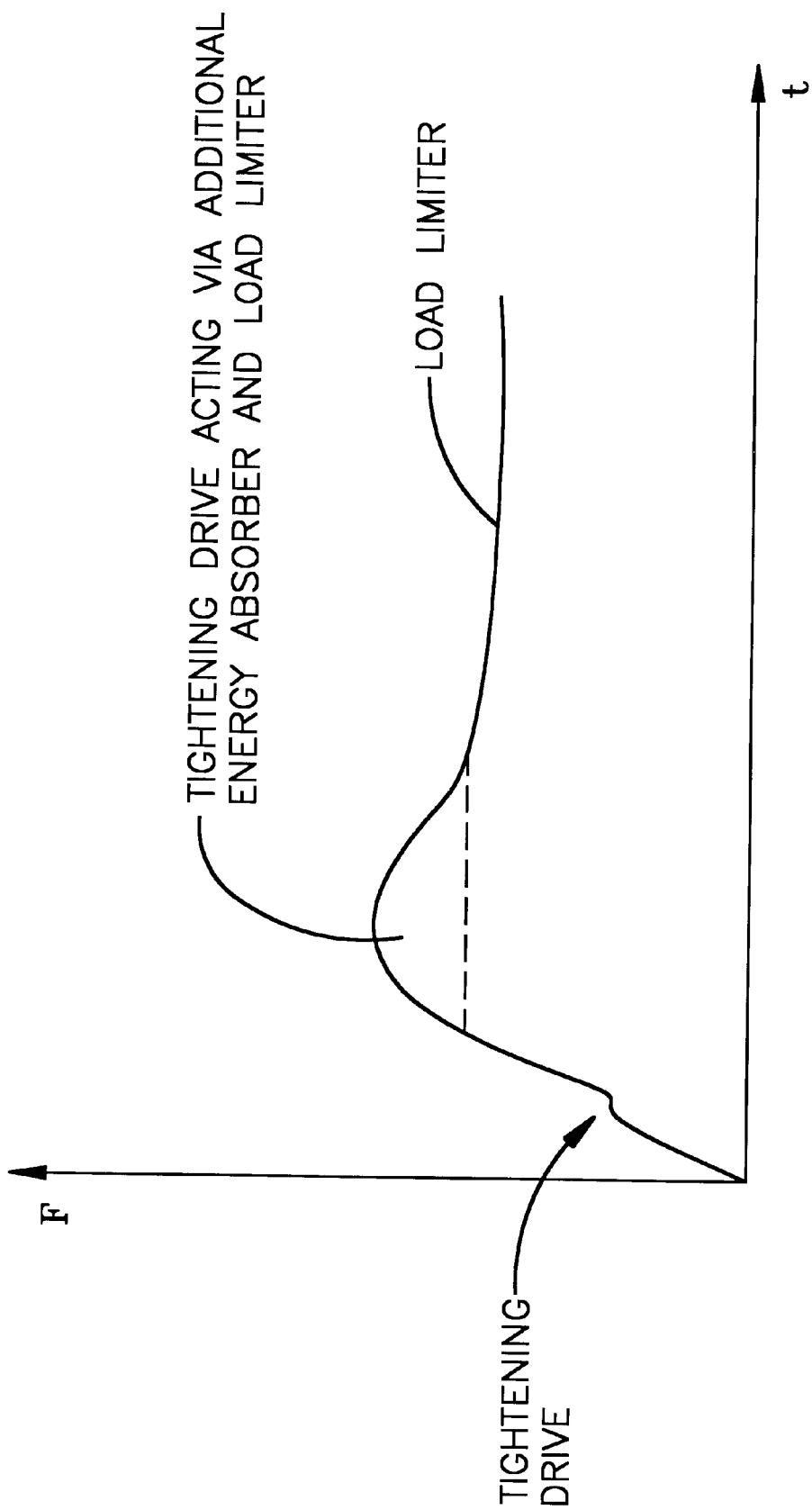
FIG. 6 is a graph showing a decreasing belt force characteristic curve that can be achieved in the present invention.

In FIG. 6, the chronological course (t) of a force F acting upon a vehicle occupant by the belt webbing is shown as a decreasing belt force characteristic curve. The force increase created by the tightening is shown in the increasing slope. Furthermore, the belt force characteristic curve involves the part of the restraint force that is determined by the load limiter 2. The region of the buckle of the characteristic curve furthermore involves the part that results from the additional torsion bar 4. In the further chronological course of the belt force characteristic curve, the restraint force is reduced to the part that is determined by the load limiter 2 alone.

The force transmission device can be designed such that below the force threshold during the transmission of the torque created by the tightening drive, it initially represents a rigid rotary drive connection and then, until a particular force threshold has been reached and/or exceeded, it forms an additional energy absorber. This can be achieved by making the force transmission device an additional torsion bar, or as a slip clutch. This ensures that, in addition to the effect of the load limiter, a force increase of the belt force characteristic curve, which results from the effect of the additional torsion bar or slip clutch, is achieved in a predetermined quantity. During the course of the crash, this additional force decreases, and that when the tightening drive has accelerated so strongly that no further relative rotation of the tightening drive needs to be introduced to the belt reel a decreasing belt force characteristic curve can be achieved.

Figure 2:
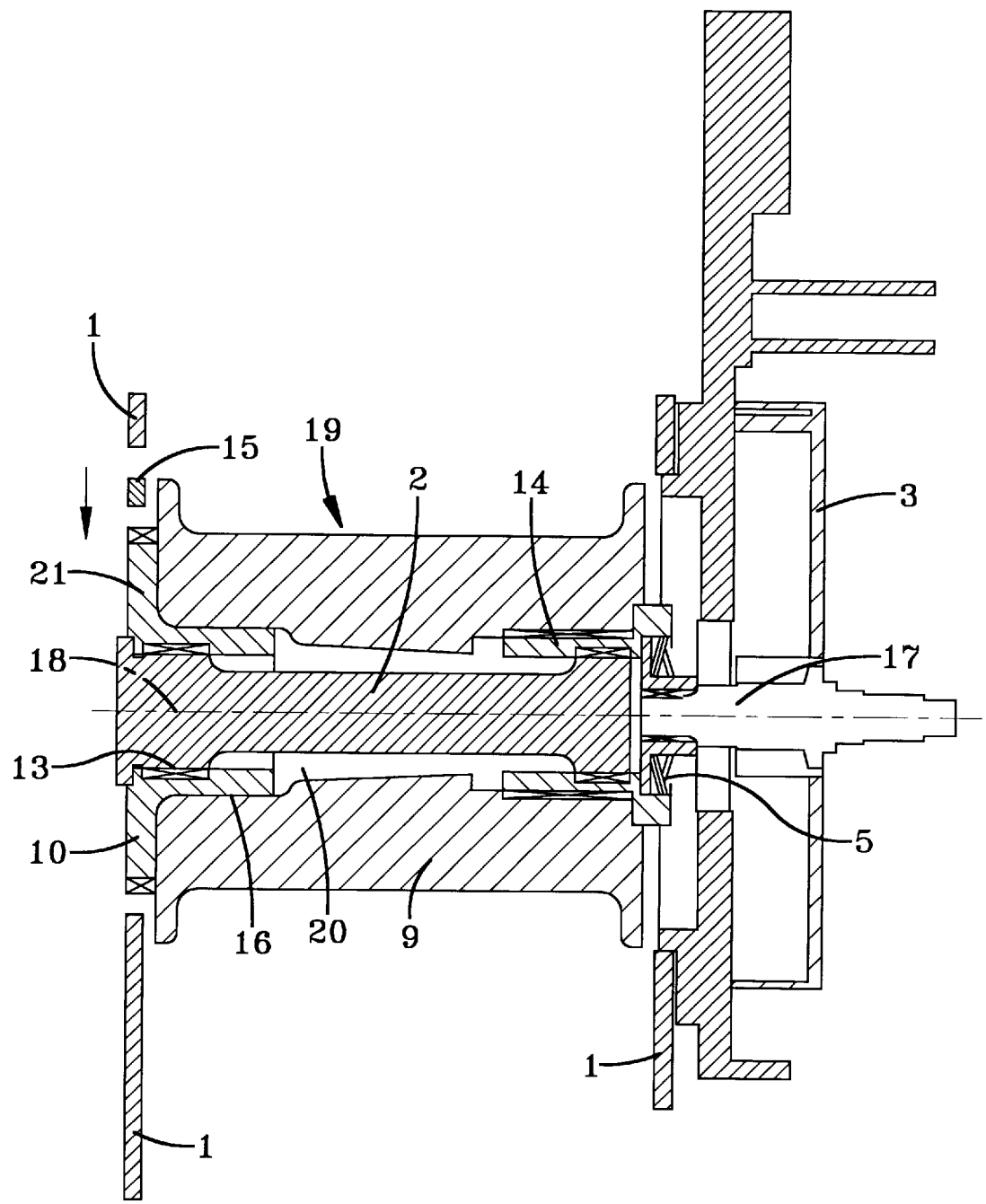
FIG. 2 is a longitudinal diagrammatic cross section of a seat belt retractor according to a second embodiment of the invention.

In the embodiment represented in FIG. 2, the torque supplied by the tightening drive 3 via the drive shaft 17 is transmitted via a slip clutch 5, which is an additional energy dissipation device, to the belt reel 19, in particular the rotatable spool 9. As long as the adhesive force of the slip clutch is effective, it is added to the restraint force, which is determined by the force limiter 2. After the exceeding of the adhesive friction force, the restraint force decreases and the course of the belt force characteristic curve is reduced to the part which is carried out by the load limiter 2. In this embodiment a decreasing belt force characteristic curve as shown in FIG. 6 is achieved.

Figure 3:
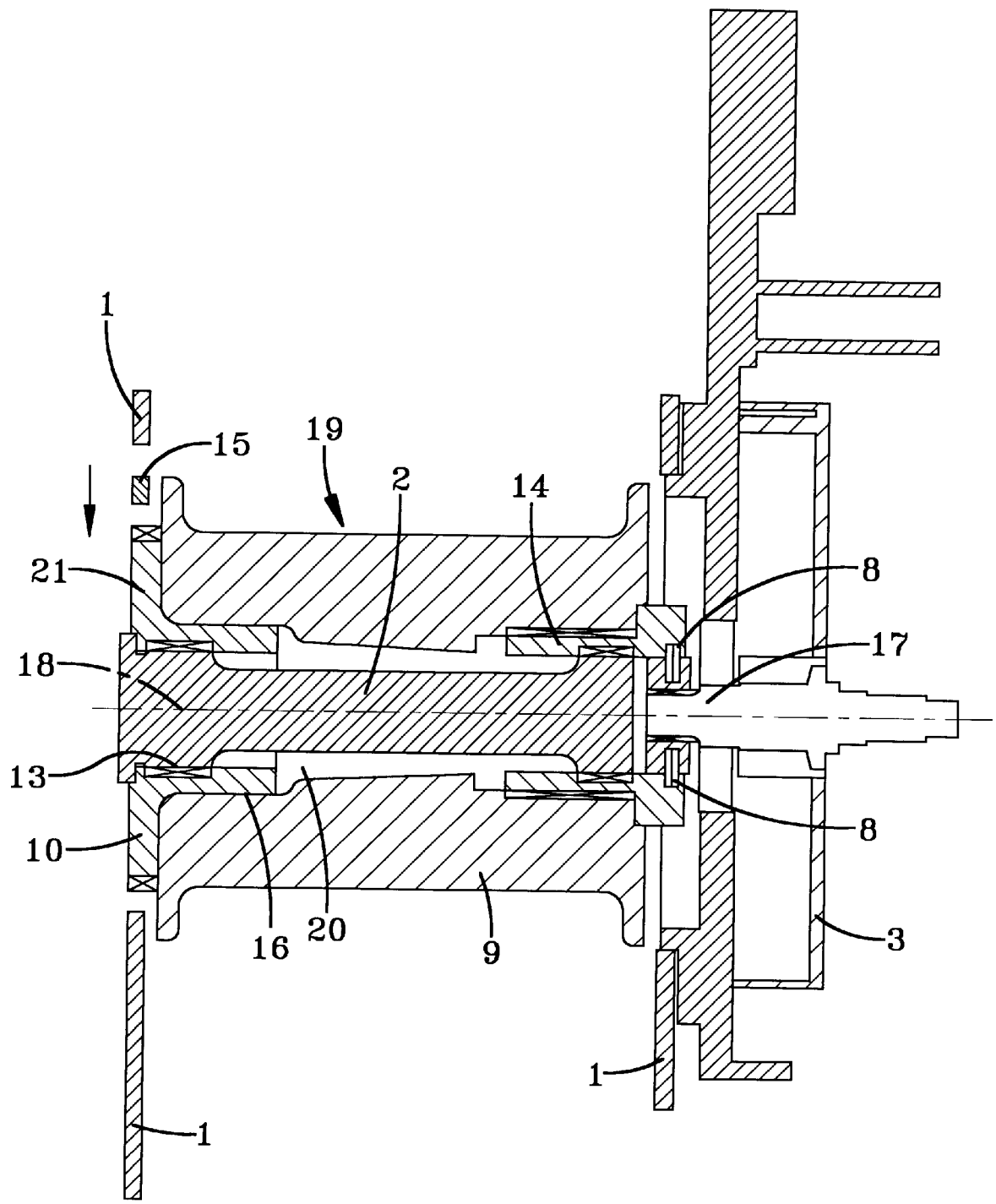
FIG. 3 is a longitudinal diagrammatic cross section of a seat belt retractor according to a third embodiment of the invention.

In the embodiment shown in FIG. 3, the torque created by the tightening drive 3 is transmitted from the drive shaft 17 via shearing elements 8, for instance shearing pins, to the belt reel 19, in particular the rotatable spool 9. The shearing elements 8 are designed such that the torque created by the tightening drive 3 is transmitted to the belt reel to tighten the seat belt. The shearing elements 8 can preferably be designed such that during the forward displacement of the body of the seat belt-wearing vehicle occupant, an additional force acting between the belt reel 19 and tightening drive 3 can be taken up, so that up until a force threshold, an influence of the restraint force beyond the effect of the force limiter 2 is achieved by the tightening drive 3. When the force threshold is exceeded, the shearing elements are interrupted and the restraint force decreases back to the restraint force achieved by the load limiter 2, as is shown in the decreasing belt force characteristic curve of FIG. 6. To support the course of the decreasing belt force characteristic curve, between the tightening drive 3 which is preferably an electromotive drive, and the drive shaft 17, a gear can be connected, as is known for instance from DE 199 27 731 A1. Such a gear can also be provided in the other embodiments of FIGS. 1 to 5. When a preselected force threshold resulting from the belt load limiter effect and the torque created by the tightening drive is reached in the force transmission device, the torque transmission from the tightening drive to the belt reel is stopped, whereby the restraint force originating from the applied seat belt is essentially determined by the load limiter alone.

Figure 4:
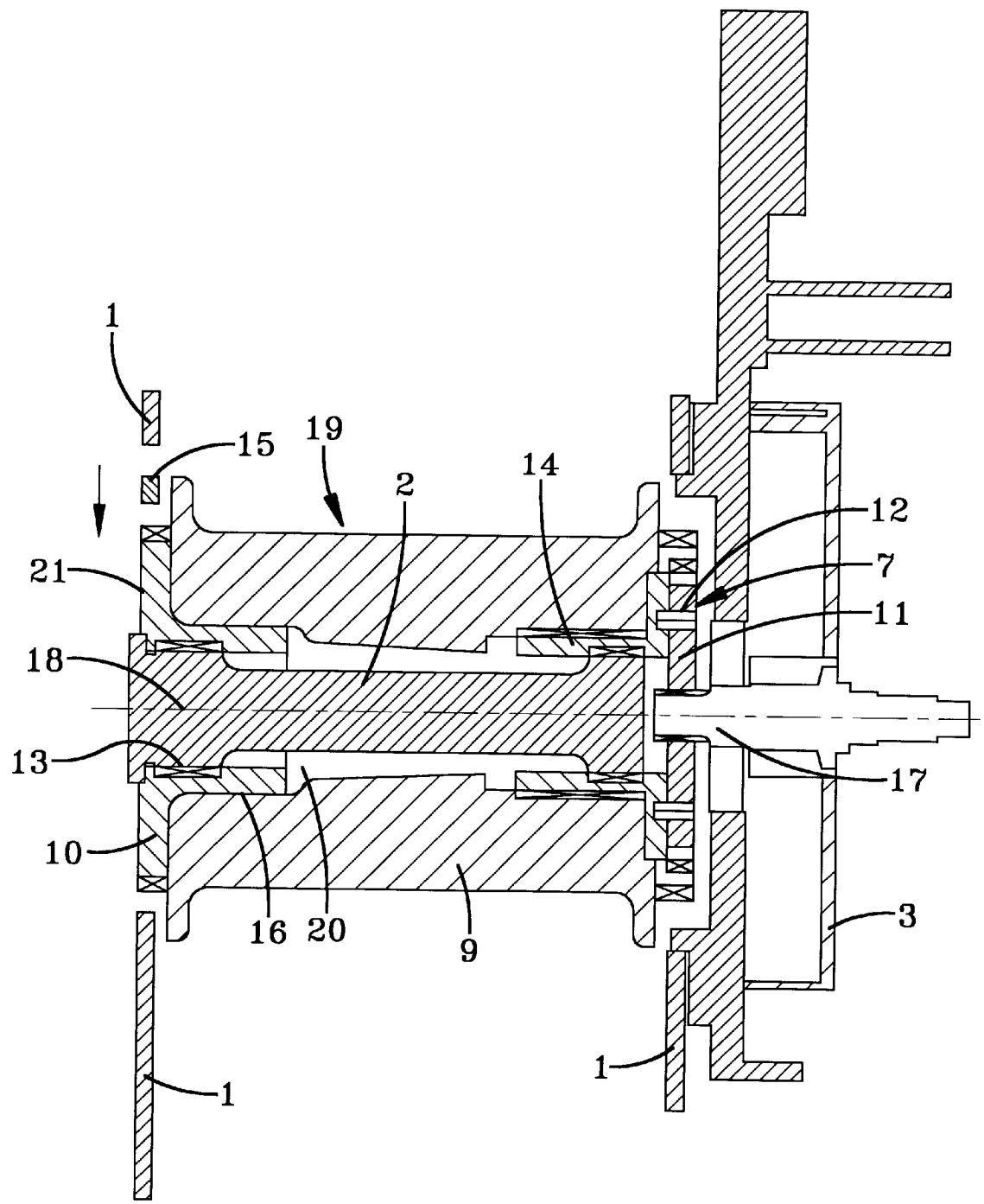
FIG. 4 is a longitudinal diagrammatic cross section of a seat belt retractor according to a fourth embodiment of the invention.

In the embodiment shown in FIG. 4, a coupling 7 is connected between the drive shaft 17 and the belt reel 19, in particular the rotatable spool 9. The coupling 7 in its coupled state engages the drive shaft 17 and the rotatable spool 9 in a positive locking manner. A rotatably rigid force transmission device is created between the drive shaft 17 and the belt reel 19. In the represented embodiment, the coupling 7 comprises one or more coupling pawls 11, which are pivotally mounted in a drag bearing 12, for instance a pivot pin, fastened to the belt reel, in particular to the rotatable spool 9.

If after the tightening of the seat belt, that is to say after the transmission of the torque created by the tightening drive to the belt reel 19, the seat belt-wearing vehicle occupant moves forward, a force is generated between the belt reel 19 and the drive shaft 17 which, if a preselected force threshold is exceeded, disengages the coupling 7. This can take place when a relative rotation between the rotatable spool 9 and the drive shaft 17 occurs, through which the coupling is moved out of its rotatably rigid drive connection.

Figure 5:
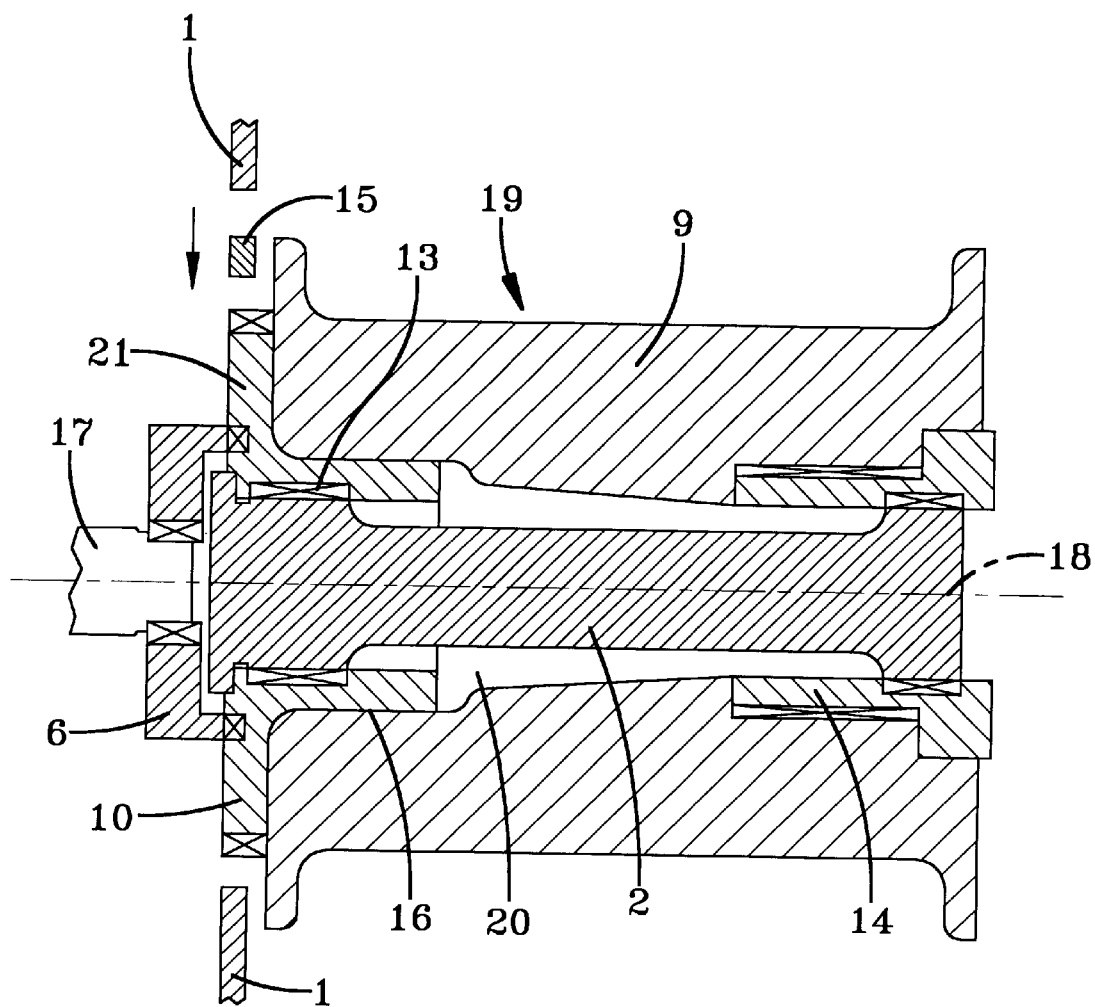
FIG. 5 is a longitudinal diagrammatic cross section of a seat belt retractor according to a fifth embodiment of the invention.

In the embodiment shown in FIG. 5, the drive shaft 17 is connected in a rotatably rigid manner via a rigid force introduction piece 6, which forms the force transmission device, to the spool insert 10 which can be blocked against rotation. In the represented embodiment, the torque created by a tightening drive, that is not further illustrated, is introduced via a rigid force introduction piece 6 into the spool insert 10, which is blocked against rotation by the blocking device 15 engaging the flange 21 of the spool insert during the restraint of the seat belt-wearing vehicle occupant, in particular after the tightening of the seat belt. The blocking against rotation of the spool insert 10 negates an influence of the belt forces via the tightening drive. The restraint force of the seat belt is therefore determined by the force limiter 2 alone.

From the foregoing, it will be apparent to those skilled in the art that modifications may be made without departing from the spirit and scope of the invention. Accordingly, the invention is not intended to be limited except as may be made necessary by the appended claims.

I claim:

1. A seat belt retractor comprising:
    a two-piece belt reel rotatably mounted on a seat belt retractor frame, the belt reel comprising a spool onto which a seat belt webbing can be wound, said spool having a passageway extending longitudinally therethrough, and a spool insert inserted in said passageway;
    a tightening drive that generates a torque;
    a force transmission device via which torque can be transmitted from the tightening drive to the belt reel for winding up a webbing winding onto the spool wherein the force transmission device comprises an energy absorber, the energy absorber is a torsion bar; and
    a load limiter located in the passageway through said spool and connected to both the spool and the spool insert, said load limiter limiting force from a seat belt webbing on a seat belt-wearing vehicle occupant during an accelerated forward displacement of the seat belt-wearing vehicle occupant, whereby during the force limitation the spool insert is blocked against rotation and the spool rotates and energy is dissipated through the load limiter and the torque transmission from the tightening drive to the belt reel is interrupted, when a preselected force threshold resulting from the belt load limiter effect and the torque created by the tightening drive is reached in the force transmission device, the torque transmission from the tightening drive to the belt reel is stopped, whereby the restraint force upon the seat belt-wearing vehicle occupant originating from the applied seat belt is essentially determined by the load limiter alone, wherein the load limiter is a torsion bar.

2. The seat belt retractor according to claim 1 wherein the force transmission device comprises a rigid force introduction element that is connected in a non-rotatable manner to the spool insert.

3. The seat belt retractor according to claim 1 wherein the force transmission device comprises a coupling that is connected between a drive shaft driven by the tightening drive, and the spool during effective force limitation.

* * * * *